(12) United States Patent
Caesar et al.

(10) Patent No.: US 6,453,054 B1
(45) Date of Patent: Sep. 17, 2002

(54) METHOD OF RECOGNIZING SEQUENCES OF NUMERALS USING A SLIDING FRAMES

(75) Inventors: Torsten Caesar, Ulm; Joachim Gloger, Bibertal; Eberhard Mandler, Ulm; Volker Stampa, Neuwied, all of (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/171,104

(22) PCT Filed: Apr. 3, 1997

(86) PCT No.: PCT/EP97/01676
§ 371 (c)(1),
(2), (4) Date: May 6, 1999

(87) PCT Pub. No.: WO97/38393
PCT Pub. Date: Oct. 16, 1997

(30) Foreign Application Priority Data

Apr. 11, 1996 (DE) .......................... 196 14 285

(51) Int. Cl.[7] ................................................. G06K 9/00
(52) U.S. Cl. ........................................ 382/101; 382/102
(58) Field of Search ................................ 382/101, 102, 382/103, 177, 178, 171, 173, 175, 176, 179, 180, 186, 185, 192, 198

(56) References Cited

U.S. PATENT DOCUMENTS 5,216,725 A * 6/1993 McCubbrey ................. 382/102
5,485,531 A * 1/1996 Ichinohe et al. ............ 382/198
5,933,525 A * 8/1999 Makhoul et al. ............ 382/186

OTHER PUBLICATIONS

"Preprocessing and Feature Extraction for a Handwriting Recognition System" by T. Caesar et al. pp. 408–11. 1998.
"Off–Line Handwritten Word Recognition Using a Hidden Markov Model Type Stochastic Network" by M. Chen et al. IEEE Transactions, vol. 16, No. 5, May 1994.

* cited by examiner

Primary Examiner—Andrew W. Johns
Assistant Examiner—Seyed Azarian
(74) Attorney, Agent, or Firm—Venable; Norman N. Kunitz; Jeffri A. Kaminski

(57) ABSTRACT

Described is a method of recognizing sequences of handwritten and/or joined-up numerals, in particular post codes, the method calling for the conversion of of feature vectors, thus enabling the sequence of numerals to be recognized using an HMM recognition device without the need for segmentation of the image. Also described are particularly relevant examples of feature extraction.

8 Claims, 1 Drawing Sheet

METHOD OF RECOGNIZING SEQUENCES OF NUMERALS USING A SLIDING FRAMES

FIELD OF THE INVENTION

The invention relates to a method of recognizing sequences of numerals.

Machine-based recognition of numeral sequences is of particular significance, and has long been used for automatically recognizing postal codes in letter-sorting systems.

BACKGROUND OF THE INVENTION

High success rates are achieved in the recognition of individual numerals. For example, R.A. Wilkinson, J. Geist, S. Janet et al.: The First Census Optical Character Recognition System Conference, National Institute of Standards and Technology, U.S. Department of Commerce, Gaithersburg, USA, 1992, describes such success rates. For recognizing sequences of numerals, therefore, it is standard practice to segment the images obtained from optical sampling of numeral sequences into partial regions for individual numerals, thus attributing the recognition problem to the recognition of individual numbers, see Y. Saifullah, M.T. Manry: Classification-based segmentation of ZIP codes, IEEE Transactions on Systems Man and Cybernetics, Vol. 23, No. 5, pp. 1437–1443, 1993. R. Fenrich, S. Krishnamoorthy: Segmenting Diverse Quality Handwritten Digit Strings in Near Real Time, $4^{th}$ Advance Technology Conference, USPS, Vol. 1, pp. 523–537, 1990. M. Shridhar, A. Badreldin: Recognition of isolated and simply connected handwritten numerals, Pattern Recognition, Vol. 19, pp. 1–12, 1986. Such segmenting is particularly difficult and costly for handwritten and/or connected numeral sequences.

From methods of recognizing handwritten words, it is already known to avoid segmenting and to effect the recognition process using a sequence of feature vectors that respectively represent properties of a narrow section of the written image, with the aid of an HMM (Hidden Markov Model) identifier, as described in T. Caesar, J.M. Goger, A. Kaltenmeier, E. Mandler: Recognition of Handwritten Word Images by Statistical Methods, $3^{rd}$ Int. Workshop on Frontiers in Handwriting Recognition, Buffalo, pp. 409,41.6 1993.

An especially significant application of such an HMM identifier is the extraction of the features of the feature vectors.

SUMMARY OF THE INVENTION

It is the object of the present invention to provide a method that can be used advantageously with an HMM identifier to recognize numeral sequences.

A method of recognizing sequences of numerals, is provided. A screen image of the numeral sequence is generated. A linear representation of the numeral sequence is derived from the screen image. An upper line, a lower line and a center line are estimated as writing lines for the linear representation of the numeral sequence. The linear representation is subdivided into horizontally-overlapping frames, which are in turn subdivided into a plurality of regions, each encompassing one of the writing lines and overlapping one another vertically. Within each frame, features of line segments extending in the regions are determined separately for the regions as components of a feature vector for this frame. The feature vectors of horizontally-consecutive frames are supplied as a vector sequence to an HMM identifier.

The invention offers an efficient method of recognizing handwritten and/or connected numeral sequences, particularly handwritten postal codes. The extraction of the features for the feature vectors advantageously takes into account the peculiarities of numeral sequences.

BRIEF DESCRIPTION OF THE DRAWINGS

The invention is described in detail below by way of advantageous embodiments, with reference to the drawing, in which: The FIGURE illustrates, as a section of a numeral sequence, a numeral "2" as a solid line and line segments F of a successive character.

DETAILED DESCRIPTION OF THE PREFERRED EMBODIMENTS

Figure 1:
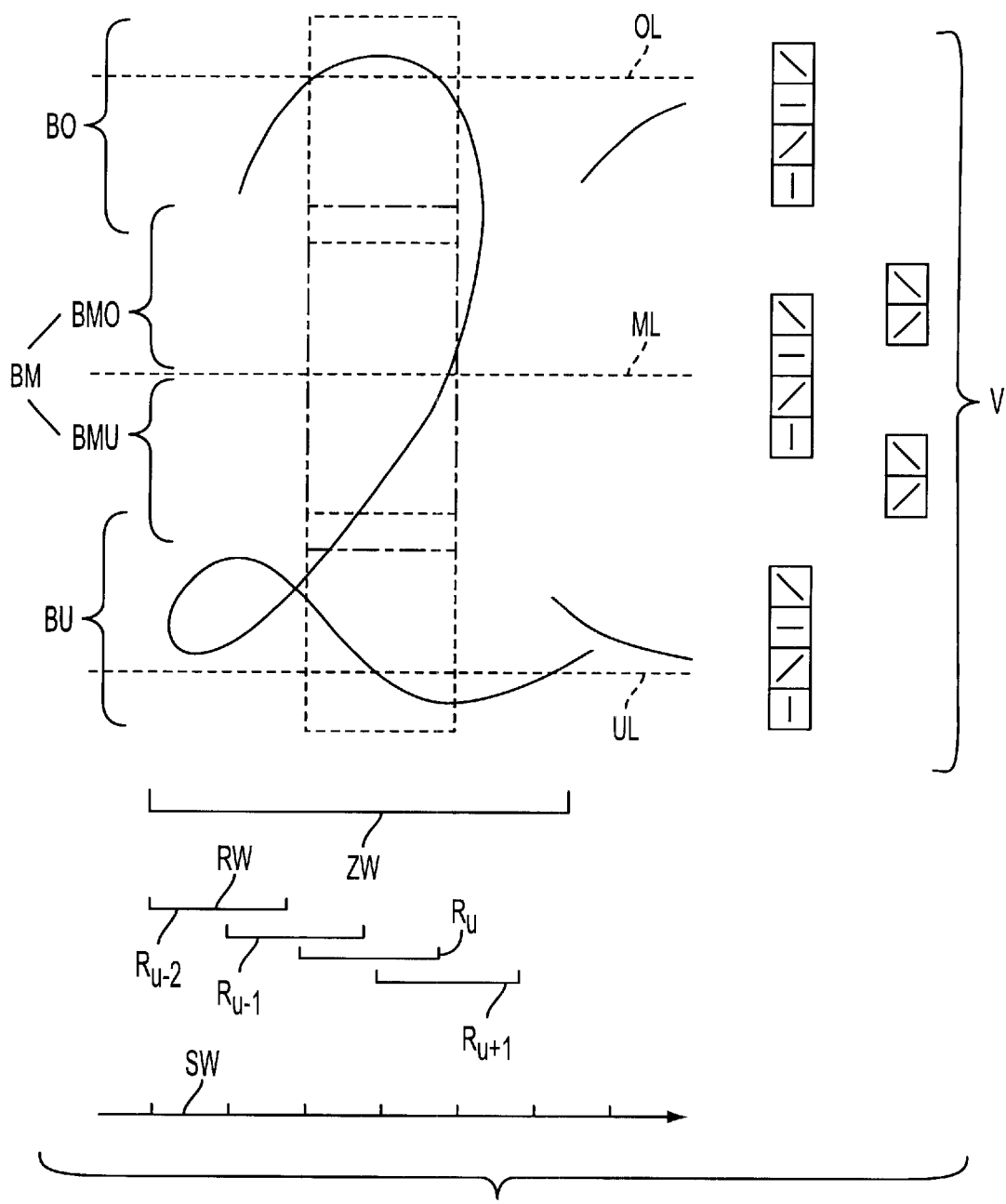

Referring to the figure, the solid line is formed by a sequence of occupied raster points (pixels) within a raster, or by a few pixels as support points of a polygonal representation. With known methods, for example contour representation of the screen image as described in E. Mandler, M.F. Oberlander: A single pass algorithm for fast contour coding of binary images, Proceedings of the $12^{th}$ DAGM Symposium, 1990 (in German), a linear representation in the form of a row of pixels with a uniform line width of one pixel, or an ideally-thin, approximately-polygonal line, is obtained from the screen image generated during the optical sampling; the image typically has a line thickness of several pixels. Numerous methods are known for this type of narrowing, also referred to as thinning, of the original screen image. Further pre-processing steps that are also known to one of skill in the art, such as rotation, shear scaling, etc., of the screen image or its representations, can be provided.

With the use of the vertical minima and maxima of the thinning lines, an upper line OL and a lower line UL are estimated as the writing lines of the numeral sequence image from the linear representation of the numeral sequence. The vertical minima and maxima are preferably determined by means of a window that is displaced horizontally in steps and has a window width greater than the width of one numeral, and is preferably about twice the numeral width. A vertical maximum or minimum are determined at each window position, and a straight line for the upper line OL and lower line UL is determined from the two value sequences for the maxima and minima, respectively, using a regression analysis. The upper OL and lower UL lines are therefore not necessarily parallel. A middle line ML can be estimated as a center line between the upper OL and lower UL lines, or, by means of a separate linear regression, a center line ML can be estimated from the combination of the value sequences of the vertical maxima and minima. As is standard practice, the horizontal direction is used as the writing direction, and the vertical direction is assumed to be transverse to the writing direction. The numeral width can preferably be estimated from the original screen image or its contour representation. In numeral sequences having a known, anticipated number of numerals, the numeral width can also easily be assumed as a fraction of the numeral sequence length.

In the linear representation, the image of the numeral sequence is subdivided into narrow, horizontal frames $Rn_{n-2}$, $R_{n-1}$, $R_{n+1}$ . . ., which follow one another in overlapping fashion. The frame width RW is merely a fraction, particularly about 25%–40%, preferably about one-third, of the numeral width ZW. One frame extends over all three writing lines, and is again subdivided into three regions that each encompass one writing line and overlap in the vertical direction. On the respective side facing away from the center line. the upper region BO, encompassing the upper line OL, and the lower region BU, (both shown with a dotted border in the drawing) encompassing the lower line UL, extend beyond the encompassed writing lines in the vertical direction in order to also recognize flourishing curves. The extent of the consideration of over-wide lines can be set through the vertical extension of the frames BO and BU beyond the lines OL and UL, respectively. As will be explained below, a center region BM, which encompasses the center line ML, is preferably subdivided into two partial regions BMO and BMU, above and below the center line ML, respectively, for more comprehensive feature recognition.

As marked in the scale located at the bottom of the drawing, the frame positions are respectively offset from one another by one step width SW. Because the step width SW is smaller than the frame width RW, adjacent frames overlap horizontally. The horizontal frame sequence is identical in value to the horizontal displacement of a frame in the step widths SW.

In each frame position, a feature vector is formed with components that characterize properties of the line segments of the linear representation of the numeral sequence. Here the three regions BO, BM and BU are treated separately. The orientations of the different regions are used as characteristics values of the line segments, with four quantized orientations of the horizontal and vertical directions, and the two diagonal directions between them, namely 45° to the left or right (correspondingly, 0°, 45°, 90° and 135° with respect to the writing direction), being predetermined as vector components. Thus, four vector components are associated with each region. Two additional vectors components are preferably associated with the partial regions BMO and BMU formed by the subdivision of the center region MB; only the diagonal line components should be detected in these partial regions. Consequently, symmetry properties of individual numbers can be used simply and effectively. This yields a total of 16 vector components, shown on the right side of the figure, which form the feature vector V at one frame position. For the quantitative determination of the values for the vector components, the appearance of line segments in the predetermined orientations is determined in binary fashion and the accumulated longitudinal components of the segments are determined at the different orientations. A linear representation in the form of rows of adjoining pixels is particularly suited for this quantitative determination, because the respective horizontal, vertical or diagonal proximity of pixels can be counted directly as a contribution to the relevant orientations. In a polygonal representation, line segments oriented between two quantized orientations are preferably factored in as components of these two orientations. The accumulated longitudinal components determined in this manner can be normalized to the region size.

The sequence of feature vectors at consecutive horizontal frame positions is supplied as a vector sequence to an HMM identifier for non-segmented recognition of the numeral sequence. The recognition method described above can be used particularly advantageously for recognizing handwritten and/or connected postal codes. The method is preferably used in connection with a reduction of a lexicon of allowable numeral sequence through advance use of an individual-numeral identifier.

What is claimed is:

1. A method of recognizing sequences of numerals, comprising the following steps:
   generating a screen image of the numeral sequence;
   deriving a linear representation of the numeral sequence from the screen image;
   estimating writing lines;
   subdividing the linear representation into horizontally-overlapping frames, which are in turn subdivided into a plurality of vertically-superposed regions;
   determining features of the line segments extending in the region as components of a feature vector, separately for the regions within each frame;
   supplying the feature vectors of horizontally-consecutive frames to an HMM identifier as a vector sequence, wherein
     an upper line, a lower line and a center line are estimated as writing lines from the linear representation;
     selecting as vertically-superposed regions of the linear representation;
       a region encompassing the upper writing line,
       a region encompassing the lower writing line,
       and a region encompassing the center writing line, with the bordering regions overlapping the vertically and, in addition, the region that encompasses the center writing line being subdivided into a portion above the center writing line and a portion beneath the center writing line, in which partial regions only the diagonal features of the line segments extending therein are determined.

2. A method for recognizing a numerical sequence, comprising:
   generating a screen image of the numerical sequence;
   deriving a linear representation of the numerical sequence from the screen image;
   estimating an upper writing line, a lower writing line and a center writing line from the linear representation;
   subdividing the linear representation into horizontal frames that overlap;
   subdividing the linear representation into a plurality of vertically super-posed regions including a first region encompassing the upper writing line, a second region encompassing the lower writing line, and a third region encompassing the center writing line, wherein adjacent ones of the regions overlap and the third region is subdivided into a first portion above the center writing line and a second portion below the center writing line;
   determining for each region within each of the horizontal frames, features of line segments of the numerical sequence extending in the region as components of feature vectors, wherein only diagonal features of the line segments extending in the first and second portions of the third region are determined in the first and second portions; and
   supplying the feature vectors of horizontally consecutive frames to a HMM identifier as a vector sequence.

3. The method according to claim 2, wherein a horizontal width of the frames is selected to be between 25% and 40% of the width of a single numeral in the numerical sequence.

4. The method according to claim 2, wherein the upper and lower writing lines are determined as straight lines from vertical maxima and minima, respectively, of the linear representation by means of a regression analysis.

5. The method according to claim 2, wherein different quantified linear orientations are predetermined in individual ones of the regions as components of the feature vectors.

6. The method according to claim 4, wherein vertical, horizontal, and diagonal line courses are predetermined as quantified line orientations.

7. The method according to claim 2, wherein a width of a single number in the numerical sequence is derived from the screen image of the numerical sequence.

8. The method of claim 7, wherein the upper writing line, the center writing line and the lower writing line intersect the numerical sequence.

* * * * *